May 30, 1933.   T. H. SYMINGTON   1,911,331
ABSORPTION SHIM FOR TRUCKS
Filed Sept. 24, 1930
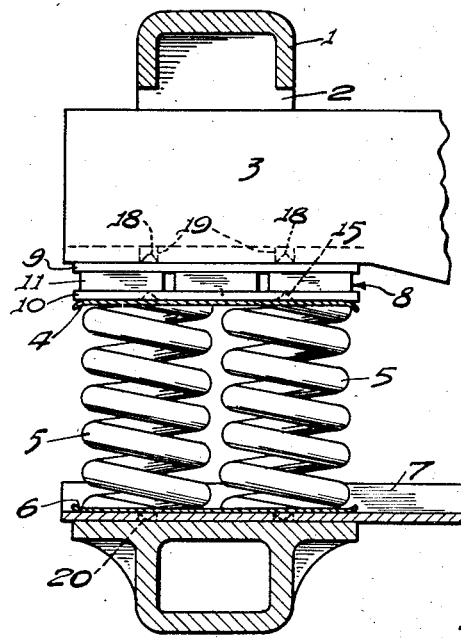
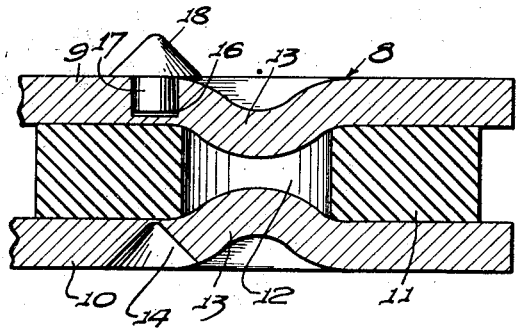
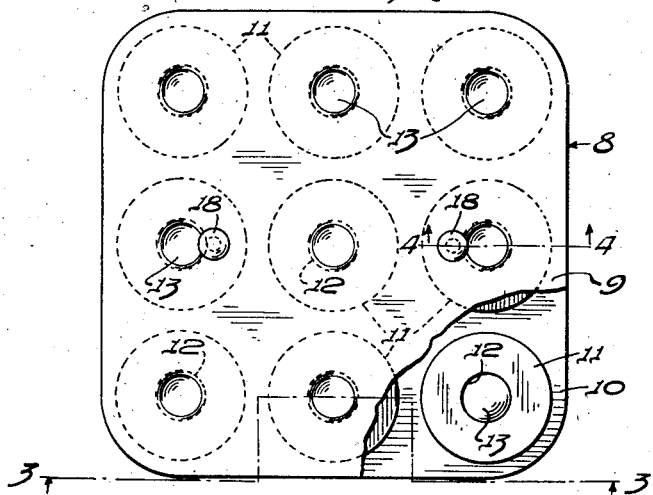
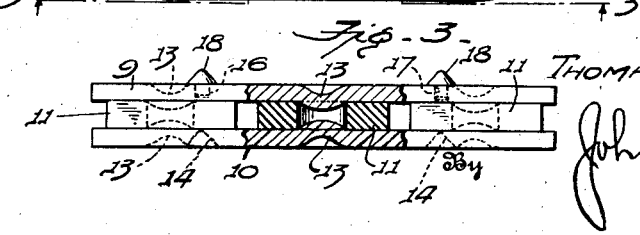
Inventor
THOMAS H. SYMINGTON
By John Milton Jester
Attorney Patented May 30, 1933

1,911,331

UNITED STATES PATENT OFFICE

THOMAS H. SYMINGTON, OF BALTIMORE, MARYLAND, ASSIGNOR TO T. H. SYMINGTON & SON, INC., OF BALTIMORE, MARYLAND, A CORPORATION OF MARYLAND

ABSORPTION SHIM FOR TRUCKS

Application filed September 24, 1930. Serial No. 484,176.

The invention relates to railway equipment, particularly to accessories or attachments for use in connection with the trucks of freight cars, and the present application is a continuation in part of and embodies improvements in the subject matter of my co-pending application for Absorption shim for freight car trucks, filed September 20th, 1929 and given Serial No. 394,023.

It is of course well known that in the ordinary truck construction the truck bolster extends within a window opening in the side frame and is supported by a plurality of helical springs which yieldingly support the load. Springs of this, or in fact any other type, have a certain natural period of vibration. It is also known that when a freight car is traveling over a track the passage of the truck wheels over the rail joints sets up certain impulses tending to produce vibration. At certain speeds these impulses are synchronized with the natural period of vibration of the springs and the result is the development of a side sway of the car particularly as the joints in the rails are staggered. When a rocking movement of the car and truck bolster develops there is a great compression of the springs beneath the bolster end which is moving downwardly. When a sway in the other direction takes place it has been found that the recoil is so strong that the rising end of the bolster is thrown clear off from the springs. In a certain recent test of a car having a load of eighteen tons it was found that at certain different speeds, particularly at about forty-three and forty-eight miles per hour an amazing degree of vertical jiggle developed with the result that on the recoil the bolster was thrown clear of the truck springs by as much as nine-sixteenth of an inch, there being naturally, a tremendous hammer blow exerted when the ends of the bolster move downwardly on the return. The shocks and jars resulting from this condition are very destructive to the equipment and particularly to the car lading.

It is with the above facts in view that I have devised the present invention which has for its general object the provision of an absorption means adapted to be interposed in the truck in series with the truck springs for cushioning the blows and absorbing the shocks upon the inevitable development of car jiggle under certain conditions of speed, etc.

An important object of the invention is to provide an absorption means in the nature of a compressible or yieldable shim located preferably between the truck springs and the truck bolster and operating to take a large proportion of the shock so that the equipment itself and the lading will be relieved.

A more specific object of the invention is to provide an absorption shim embodying an elastic cushion, preferably of rubber, together with the necessary metallic elements for the protection thereof, this shim being adapted for insertion between the truck bolster and the truck springs or spring cap.

Yet another object of the invention is to provide an absorption shim of this type in which the degree of compression is limited so as to avoid subjecting the yielding material to a strain greater than that it is capable of withstanding.

A still more specific object of the invention is to provide an absorption shim-like device embodying a combination of metallic and rubber elements so related that the latter will absorb or cushion blows of certain intensity while the former will take the shock of an over-solid blow or load and prevent destruction of the rubber.

A still further object of the invention is to provide a removable and renewable shim device of this type in which the rubber element or elements will be of such construction or formation as to permit the flattening out or lateral expansion of the rubber under strain without causing permanent distortion.

Another object is to provide a device of this character having means for effecting centering or positioning thereof with respect to the spring nest.

A more specific object of the present invention is to provide means formed integrally with the metallic elements enclosing the cushion members for limiting the extent of compression of the latter, thereby avoiding any necessity for the employment of auxiliary or additional elements and consequently reducing the number of necessary parts.

Another very specific object is to provide a device of this character in which one of the metallic members is equipped with an additional element acting to maintain the device in proper position with respect to the spring nest and bolster, the other metallic member being itself formed to accommodate the usual retaining means on the upper cap of the spring nest, for the same purpose.

An additional object is to provide a device of this character which may be modified for use in connection with spring nests of different sizes, depending upon the type of car and load capacity thereof and which will, moreover, be simple and inexpensive to make, easy to install, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a vertical sectional view taken across the side frame at one side of a car truck and showing the truck bolster in elevation with my device interposed between it and the spring nest, Figure 2 is a plan view of the device alone with one of the metal plates thereof broken away, Figure 3 is a section taken on the line 3—3 of Figure 2, and Figure 4 is a detail section taken on the line 4—4 of Figure 2.

Referring more particularly to the drawing, it will be noted that I have shown a portion of a standard A. R. A. truck including a side frame 1 having a window opening 2 therein through which extends one end of the truck bolster 3 which is ordinarily engaged upon the spring cap 4 at the top of a nest of, usually, helical springs 5 which in turn are engaged upon a lower cap 6 resting on the spring plank 7 which extends across the truck. Of course the entire structure is duplicated at both sides of the truck, only one side being here shown as that is entirely adequate for purposes of illustration.

In accordance with my invention I provide in series with the springs 5, and between the upper cap 4 and the bolster or between the lower cap 6 and the spring plank 7, though preferably in the first mentioned position, a shock absorbing or cushioning shim indicated as a whole by the numeral 8. In its broadest sense, this device comprises, preferably, a rubber or equivalent cushion with stop means for limiting the compression thereof. The invention is capable of being carried out in various specific ways and various modifications, corresponding in some respects to what is disclosed in said co-pending application, may be made although only one specific embodiment is illustrated herein as such is sufficient to give a clear understanding of what is involved. The probability is that most of the possible variations are principally a matter of dimensions or shape, it being logical to have the shim device conform, at least generally, to the size of the spring nest or shape of the caps thereof, this in turn depending upon the number of springs in the nest and this being governed by the capacity of the car to be equipped with the device. Obviously the equipment is different for the light type of car having usually four springs in each nest from what is necessary for the heavier type of car with five or more springs in each nest.

As shown in the drawing, the shim device 8 comprises a pair of metal plates 9 and 10 between which are disposed symmetrically arranged pads or cushions 11 of yieldable material, preferably rubber. The metal plates 9 and 10 are intended to conform to the spring cap 4 or 6, as the case may be, and the rubber pads are not only spaced apart as shown to permit lateral expansion in all directions but are also preferably spaced inwardly from the edges of the plates so as not to protrude therebeyond when compressed. The principal function of the metal plates is to prevent distortion of the rubber pads and as they bear flatly against the bolster or the spring plank, as the case may be, and the adjacent spring cap they need not be of any great thickness. Actually they may conveniently be stamped from sheet steel of comparatively light gage, for instance, say one-fourth or three-eighths of an inch in thickness. The rubber pads are naturally several times thicker though the exact dimensions up to certain limits are more or less immaterial.

Though the shape of the pads may be varied, probably the advisable construction is to make them circular or of disk form, as shown, with central circular holes 12 which not only permit inward crowding of the material when subjected to pressure but which may be taken advantage of when it comes to the problem of providing means for maintaining the individual pads in their proper relative positions between the metal plates. To accomplish this latter mentioned function I have disclosed the plates as provided with stamped projections 13, extending toward each other, opposite and projecting into the holes 12 in the respective pads. The degree of extension of these projections into the holes depends upon the contemplated permissible degree of comprssion of the pads as it is quite obvious that when the shim device as a whole is subjected to pressure the confronting surfaces of the projections 13 will engage when the pads have become compressed to a certain extent. The extent of this movement of the plates toward each other may depend upon the quality or degree of hardness of the rubber or other equivalent material from which the pads are formed. These projections 13 constitute the stop means and as they are integral with the metal plates it is readily apparent that there is no necessity for the employment of any auxiliary or adjunctive elements, the number of necessary parts being consequently reduced. Clearly the pads cannot shift laterally in any direction owing to the engagement of the projections in their centers.

While it is barely possible that reliance might be placed solely upon friction for holding the shim device in its operative relation to the spring nest and bolster or spring plank, as the case may be, it is preferable that some positive means be provided for the purpose. Such being the case I have shown the lower metal cap 10 as formed with recesses 14 adapted to receive the projections or teats 15 commonly provided on the upper spring cap 4, and have shown the upper cap 9 as formed at corresponding points with cylindrical recesses 16 within which are engaged the cylindrical shanks 17 of conical or steeple-headed rivets 18 adapted to enter the holes 19 commonly provided in the underside of the bolster 3, which holes ordinarily receive the projections 15 on the upper spring cap. If the shim device is used between the lower cap and the spring plank then its position would be inverted with respect to what is shown in Figures 3 and 4 so that the recesses 14 would receive the projections or teats 20 on the lower spring cap 6 with the rivet heads 18 engaged within the usual openings in the spring plank.

In the operation of the device, it is apparent that it will act in series with the truck springs regardless of whether it be placed above or below the nest. When compression of the pads occurs it is apparent that the rubber is permitted to flow or crowd laterally owing to the spacing apart of the pads and the openings 12 therein. The stop means defined by the integral projections 13 will operate to prevent over-compression of the rubber. When a shim device of this type is installed within a truck it is evident that it will absorb over-solid blows and relieve the mechanism of excessive strains which would otherwise come upon it. Another point of advantage is that the yieldable pads will operate to smooth out small shocks and jars such as would not affect the springs themselves to any material extent and will consequently improve the riding qualities of the car and reduce damage to the lading particularly in cases where fruits, vegetables and other more or less perishable commodities are transported. Furthermore, as the rubber pads have a different natural period of vibration from that of the helical springs which compose the spring nest, it is evident that synchronism will be broken up and the vertical jiggle greatly reduced if not entirely eliminated. It will be noted that the construction is not only simple but extremely rugged and that in the event of any necessity for replacements the shim devices may be removed from the truck and equipped with new or fresh rubber pads. However, this would not be necessary until after the expiration of a prolonged period. It is believed that from the foregoing the construction, operation and advantages will be readily apparent to one skilled in the art without further explanation.

While I have shown and described the preferred embodiment of the invention, it should be understood that the disclosure is merely an exemplification of the principle involved as the right is reserved to make all such changes in the details of construction as will widen the field of utility and increase the adaptability of the device provided such changes constitute no departure from the spirit of the invention or the scope of the claims hereunto appended.

Having thus described my invention, I claim:

1. In a railway car truck embodying a bolster, a nest of supporting springs therefor interposed between spring caps, a yieldable cushion disposed in series with the nest in engagement with one of the caps and embodying metallic plates with rubber cushioning means interposed therebetween, the plates being formed with projections adapted to engage for limiting the compression of the cushioning means.

2. In a railway car truck embodying a bolster and a supporting spring nest therefor, an absorption shim device in engagement and operating in series with the nest and comprising a pair of metal plates and a plurality of spaced rubber pads therebetween, the pads having central holes, and said plates having integral projections entering said holes and adapted to engage and act as stop means for limiting compression of the pads.

3. In a railway car truck embodying a bolster and supporting springs therefor arranged in a nest having end caps, means disposed against a selected cap exteriorly of the nest and operating in series with the springs for absorbing shocks, said means embodying a rubber pad confined between metallic plates, said plates being formed with integral means adapted to contact for limiting compression of the rubber pad.

4. In a railway car truck embodying a bolster and supporting springs therefor, means interposed between the bolster and the springs for absorbing shocks, said means embodying a rubber pad confined between metallic plates and enclosing stop means integral with the plates.

5. An absorption device for railway car trucks comprising a shim structure constructed as a complete and separate unit adapted for interposition between the bolster and the supporting springs therefor and in direct contact with the former and comprising metallic plates, a yieldable pad interposed therebetween, and means integral with the plates for limiting compression of the pad.

6. An absorption device for railway car trucks comprising a shim structure adapted for interposition between the bolster and the supporting springs therefor and comprising metallic plates, a yieldable pad interposed therebetween, and means for limiting the compression of the pad, said limiting means consisting of integral projections extending from the confronting sides of the metallic plates and projecting into the pad normally in spaced relation and adapted to engage each other.

7. An absorption shim device for insertion between truck springs and a co-acting portion of the truck, comprising metallic plates, spaced yieldable pads interposed therebetween and each having an opening therein, and means integral with the plates entering said openings for restraining the pads against lateral displacement and limiting compression thereof.

8. An absorption device adapted for interposition between a truck bolster and a spring nest having a cap thereon provided with projections, the bolster having openings alining with said projections, said device comprising a pair of metallic plates enclosing a yieldable cushion, one plate having recesses adapted to receive said projections and the other being equipped with auxiliary elements adapted to enter said openings for maintaining the device against displacement with respect to the nest and bolster.

9. In a railway car truck embodying a bolster and a supporting spring nest therefor having a top cap formed with projections, the bolster having openings opposite said projections, an absorption shim device interposed between the nest and the bolster and comprising a pair of metallic plates and an interposed cushioning means, the lower plate having recesses receiving said projections and the upper plate having recesses in its upper side, and means seated within said second named recesses and received within said openings for maintaining the device against displacement.

10. In a railway car truck embodying a bolster and a supporting spring nest therefor having a top cap formed with projections, the bolster having openings opposite said projections, an absorption shim device interposed between the nest and the bolster and comprising a pair of metallic plates and an interposed cushioning means, the lower plate having recesses receiving said projections and the upper plate having recesses in its upper side, and means seated within said second named recesses received within said openings for maintaining the device against displacement, said means comprising rivets having enlarged heads engaging within the openings and having cylindrical shanks engaging within the second named recesses.

11. In a railway car truck embodying a bolster and a supporting spring nest having an upper cap provided with upstanding projections normally received within corresponding openings in the underside of the bolster, an absorption shim device interposed between said cap and the bolster and comprising metallic plates with an interposed yieldable cushion, the lower plate being formed to receive the projections on said cap, and auxiliary elements engaged in the upper plate and received within said openings.

12. In a railway car truck embodying a bolster and a spring nest having upper and lower caps, an absorption shim device located exteriorly of the nest in contact therewith, said shim device being constructed as a complete and separate entity and comprising a pair of metal plates, a plurality of rubber disks interposed therebetween and each having an opening, and struck out projections on said metal plates entering said openings for preventing relative displacement of the disks and directly engageable for limiting compression thereof.

In testimony whereof I affix my signature.

THOMAS H. SYMINGTON.